United States Patent
Pabla et al.

[11] Patent Number: 5,760,546
[45] Date of Patent: Jun. 2, 1998

[54] DUAL DIMMER CONTROL OF HEADLAMP HIGH- AND LOW-BEAMS

[75] Inventors: Parmjit S. Pabla, Fort Wayne; Merrill D. Miller, Huntington, both of Ind.

[73] Assignee: Navistar International Transportation Corp., Chicago, Ill.

[21] Appl. No.: 716,081

[22] Filed: Sep. 19, 1996

[51] Int. Cl.[6] ............................. H05B 41/00; B60Q 1/14
[52] U.S. Cl. ............................. 315/82; 315/77; 307/10.1; 307/10.8; 340/439
[58] Field of Search ..................... 307/10.8, 10.1, 307/112, 113, 132, 157; 340/439, 457.2, 475, 471; 315/82, DIG. 4, 76, 77

[56] References Cited

PUBLICATIONS

"Electrical Circuit Diagrams—2000, 4000, 8000 Truck And Tractor" Manual No CTS-5122S (1/95), Navistar International Transportation Corp., Jan., 1995, p. 161.

*Primary Examiner*—Robert Pascal
*Assistant Examiner*—Arnold Kinkead
*Attorney, Agent, or Firm*—Dennis K. Sullivan

[57] ABSTRACT

A circuit for implementing dual dimmer controls in an automotive vehicle having right- and left-side driver stations. The circuit can be used with existing control switches, thereby avoiding changing or redesigning those switches. The circuit uses several relays, connected in a novel configuration with other existing components.

16 Claims, 2 Drawing Sheets

DUAL DIMMER CONTROL OF HEADLAMP HIGH- AND LOW-BEAMS

FIELD OF THE INVENTION

This invention relates to automotive vehicles that have headlamps providing high- and low-beam illumination toward the front of the vehicle and that have driver stations on both right and left sides of the vehicle.

BACKGROUND AND SUMMARY OF THE INVENTION

Vehicles that have dual driver controls are used in various applications, such as street sweepers or as curbside collectors of trash, garbage, and/or recyclable materials. For example, a collection truck that services residential areas is often operated by a single person who must both drive the vehicle from stop to stop and also get out at each stop to load the curbside collection into collection bins on the vehicle. Since curbside collections may take place on either or both the right and left sides of a street, depending on the nature of the neighborhood bordering the street, and on the direction of travel of a truck along the street, a vehicle that has both right- and left-side driver stations, each equipped with its own set of driver controls, should enable a single person to perform this collection service with greater overall efficiency than if the vehicle had only a single driver station on one particular side. Although collections are more apt to take place during daylight hours, operation of such vehicles can occur at any time. Accordingly, the vehicles are equipped with headlamps providing high- and low-beam illumination, in which case it is desirable to have dual dimmer controls so that high- and low-beam illumination can be controlled from either driver station when the headlamps are on. Since sweepers are likely to operate at all hours, they should almost certainly have such dual dimmer controls.

The present invention is directed toward a cost-effective circuit for implementing dual dimmer controls in an automotive vehicle. Of special importance is the fact that the inventive circuit can be used with existing control switches, thereby avoiding added expense of changing or re-designing these switches. The presently preferred embodiment of the inventive circuit comprises the use of several relays, connected in a novel configuration with other existing components.

The foregoing, along with further features, advantages, and benefits of the invention, will appear in and from the following detailed description of a presently preferred embodiment representing the best mode contemplated at this time for carrying out the invention.

DESCRIPTION OF THE PREFERRED EMBODIMENT

Figure 1:
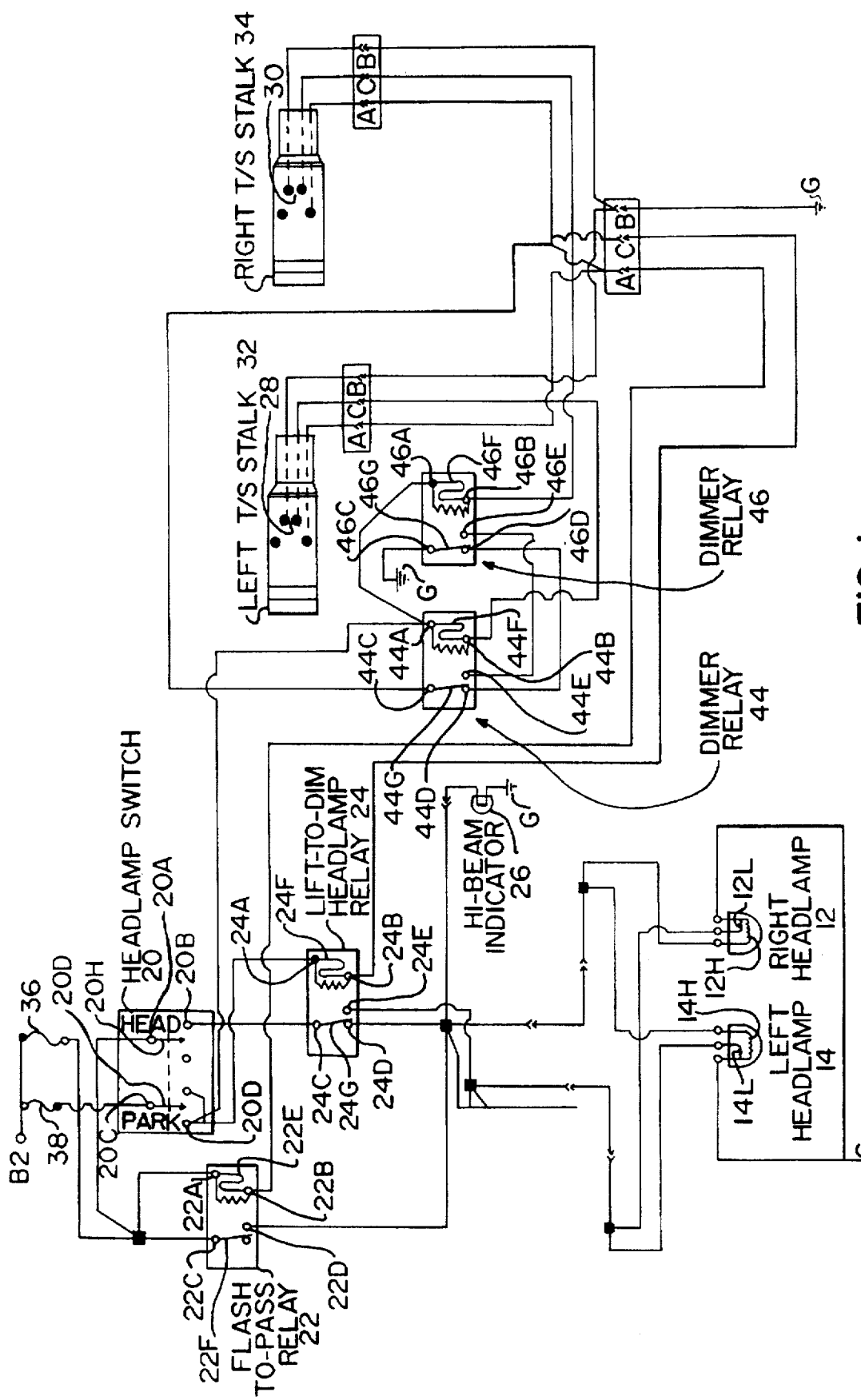
FIG. 1 is a general schematic diagram of a vehicle headlamp circuit having dual high- and low-beam illumination control in accordance with principles of the invention.

FIG. 1 shows an exemplary embodiment of a headlamp circuit 10 for an automotive vehicle containing the inventive dual dimmer control for the headlamp high and low beams. The illustrated embodiment has right and left headlamps 12 and 14 respectively, each of which is shown by example as a dual filament device having a respective high beam filament 12H, 14H, and a respective low beam filament 12L, 14L. One side of each filament is connected to ground G. The other sides of the high-beam filaments are connected in common, and the other sides of the low-beam filaments are connected in common so that the high-beam filaments are in parallel by themselves, and the low-beam filaments are in parallel by themselves.

Circuit 10 further comprises a headlamp switch 20, a flash-to-pass relay 22, a lift-to-dim relay 24, a high-beam indicator lamp 26, and dual headlamp dimmer switches 28, 30, each located at a respective left- and right-side driver control station of the vehicle. The illustrated embodiment shows that each dimmer switch 28, 30 is disposed for operation by a respective multi-function control stalk 32, 34 that is mechanically pivoted on a turn signal switch body on the steering column at the respective driver control station. Each control stalk can be pivoted in a plane about the turn signal switch body (in the plane of FIG. 1 for example), clockwise from an off position to signal a right turn, and counterclockwise from the off position to signal a left turn. Each stalk can also be pivoted in a different plane, for example by pulling the stalk generally toward the driver (i.e., out of the plane of FIG. 1). As will be explained in greater detail later on, pulling the stalk toward the driver switches the headlamps between high- and low-beams, and pulling it still farther operates the flash-to-pass feature.

The vehicle has a typical electrical power supply comprising a source of D.C. potential B2 (positive in this embodiment) relative to ground G.

Headlamp switch 20 comprises terminals 20A, 20B, 20C, and 20D, a parking lamp switch portion 20P, and a headlamp switch portion 20H. Voltage from source B2 is supplied to terminal 20A through a circuit protection, device 36, and to terminal 20C through a circuit protection device 38 (See FIG. 2). The Figs. show headlamp switch 20 in the off position. When switch 20 is operated to park position, voltage B2 is delivered through switch portion 20P to lamps (not shown) which are connected to terminal 20D, causing them to illuminate. When switch 20 is operated to headlamp position, voltage B2 is also delivered through switch portion 20H to terminal 20B, causing headlamps 12 and 14 to illuminate at either high or low beam as selected by dimmer switches 28, 30 of the dual dimmer system that will be hereinafter more fully described.

Figure 2:
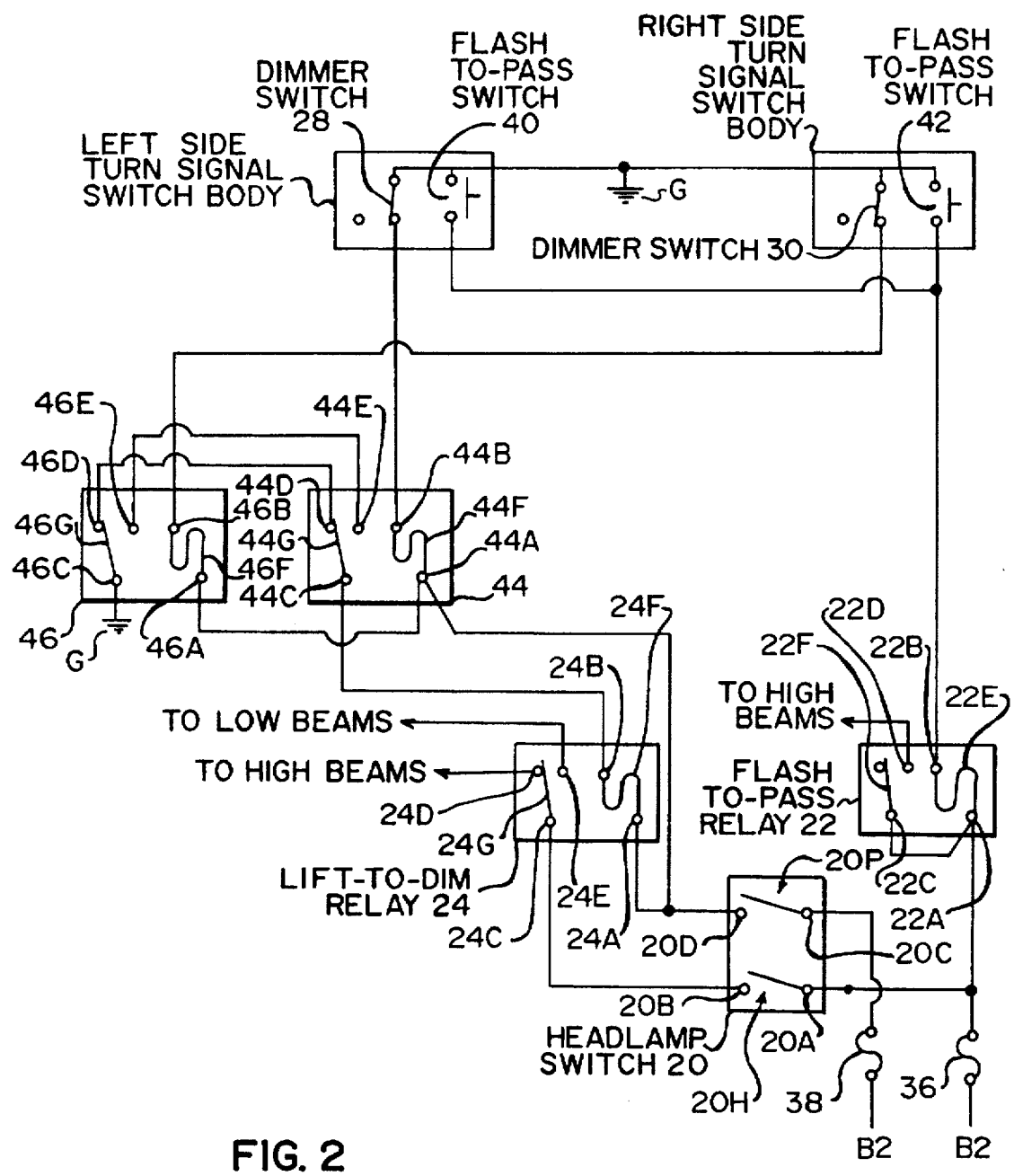
FIG. 2 is a more detailed schematic diagram of certain portions of FIG. 1.

Flash-to-pass relay 22 comprises terminals 22A, 22B, 22C, and 22D, a coil 22E connected between terminals 22A and 22B, and a movable contact 22F. FIGS. 1 and 2 portray the condition when coil 22E is not energized, causing contact 22F to be out of contact with terminal 22D. When coil 22E is energized, contact 22F operates to establish continuity between terminals 22C and 22D. Terminal 22D is connected to high-beam filaments 12H, 14H.

A respective flash-to pass switch 40, 42 (FIG. 2) is associated with a respective control stalk 32, 34. Each switch 40, 42 is normally open, but is operated closed when the respective stalk is pulled toward the driver beyond the position that switches the headlamps between high and low beams. Terminal 22B is connected in common to one side of both pass-to-flash switches 40, 42, and the other sides of switches 40, 42 are connected to ground G so that closure of either switch will energize relay 22, causing contact 22F to connect the high beam filaments to the power supply voltage and thereby illuminate the high beams. Each switch 40, 42 remains closed only so long as the respective control stalk remains fully pulled toward the driver, and consequently, when the control stalks are released, they return to a central position releasing the respective switches 40, 42, and thereby extinguishing the high-beams in the process. It is to be appreciated however, that if the high-beams are already being illuminated by the headlamp switch portion 20H being on and the dimmer system selecting high-beam operation (as will be more fully explained later), operation of the flash-to-pass feature will be redundant since the high-beams are already being illuminated.

The dimmer system further comprises a first dimmer relay 44 and a second dimmer relay 46. Relay 44 comprises terminals 44A, 44B, 44C, 44D, and 44E, a coil 44F, and a movable contact 44G. Relay 46 comprises terminals 46A, 46B, 46C, 46D, and 46E, a coil 46F, and a movable contact 46G. Coil 44F is connected between terminals 44A and 44B, and coil 46F is connected between terminals 46A and 46B. The Figs. show the condition where neither relay coil 44F, 46F is being energized. In this condition, contact 44G establishes continuity from terminal 44C to terminal 44D, but not to terminal 44E, and contact 46G establishes continuity from terminal 46C to terminal 46D, but not to terminal 46E. When coil 44F is energized, contact 44G operates to break continuity with terminal 44D and establish continuity with terminal 44E. When coil 46F is energized, contact 46G operates to break continuity with terminal 46D and establish continuity with terminal 46E.

Terminals 44A and 46A are connected in common to terminal 20D of headlamp switch 20. Terminal 44B is connected to one side of dimmer switch 28, and terminal 46B is connected to one side of dimmer switch 30. The other sides of dimmer switches 28, 30 are connected in common to ground G. Terminals 44D and 46D are connected in common, and terminals 44E and 46E are connected in common. Terminal 46C is connected to ground G. When both relays 44 and 46 are not energized (the condition shown in the Figs.), the ground from terminal 46C is conducted via contacts 44G and 46G to terminal 44C.

Lift-to-dim relay 24 comprises terminals 24A, 24B, 24C, 24D, and 24E, a coil 24F, and a movable contact 24G. Coil 24F is connected between terminals 24A and 24B. The Figs. show the condition where coil 24F is not being energized. In this condition, contact 24G establishes continuity from terminal 24C to terminal 24D, but not to terminal 24E. When coil 24F is energized, contact 24G operates to break continuity with terminal 24D and establish continuity with terminal 24E.

Terminal 44C of dimmer relay 44 is connected to terminal 24B of lift-to-dim relay 24. Terminal 24A of relay 24 is connected to terminal 20D of headlamp switch 20. Terminal 24D of relay 24 is connected to high-beam filaments 12H, 14H, and terminal 24E is connected to low-beam filaments 12L, 14L.

Each dimmer switch 28, 30 is a latching type switch wherein each time the respective control stalk 32, 34 is pulled from its rest position toward the driver to switch the respective switch 28, 30 from one position to the other, the respective switch 28, 30 remains in the new position until the respective stalk is returned to its rest position and again pulled to change the position-of the respective switch 28, 30.

With the foregoing description of the circuit construction in mind, its operation can now be explained.

Assume that the circuit is in the condition shown in the Figs. If the headlamp switch 20 is now turned on to operate the headlamps, a complete circuit provided through contacts 46G and 44G delivers a ground to terminal 24B. This energizes lift-to-dim relay 24, causing its contact 24G to establish continuity with terminal 24E. As a result, a complete circuit from the B2 power supply is provided through contact 24G to low-beam filaments 12L, 14L, thereby illuminating the low beams.

Now if either control stalk is pulled to switch the respective dimmer switch, it will break the circuit containing the coil of the respective dimmer relay 44, 46, thereby de-energizing that coil. Consequently, the contact of the respective dimmer relay will break the circuit that had been delivering the ground to terminal 24B of relay 24, causing coil 24F to de-energize. This results in contact 24G moving to break the circuit to the low beam filaments and to make a circuit to the high beam filaments, thereby illuminating the high beam filaments instead of the low beam filaments.

After that same stalk is returned to rest position and is once again pulled to switch its dimmer switch, coil 24F will again become energized to switch the headlamp feed back to low beams, instead of high beams.

Thus, the relays 44, 46, and 24 may be considered as first, second, and third controlled conduction devices. The coil of each may be considered a control input, and the movable contact, a controlled output which is controlled by the control input. Relay coil 44F and dimmer switch 28 are connected in a first series circuit. Relay coil 46F and dimmer switch 30 are connected in a second series circuit. Each of these two series circuits is connected between headlamp switch terminal 20D and ground G to provide a potential difference across each of them when the headlamp switch is operated to turn on the headlamps. The contacts 46G, 44G and coil 24F are connected in a third series circuit that is connected between terminal 20D and ground G. When headlamp switch 20 is in headlamp on position and low beams are selected, coil 24F is energized to cause contact 24G to make connection with terminal 24E. Contact 24G is in thereby placed in series with the low-beam filaments, causing the power supply voltage to be applied across the low-beam filaments. When headlamp switch 20 is in headlamp on position and high beams are selected, coil 24F is not energized, causing contact 24G to make connection with terminal 24D. Contact 24G is thereby placed in series with the high-beam filaments, causing the power supply voltage to be applied across the high-beam filaments. Consequently, when the headlamp switch is operated to turn the headlamps on, and either of the two dimmer switches is operated from one of its positions to the other of its positions, contact 24G switches the headlamps from one of the beams of illumination (i.e. high or low) to the other of its beams of illumination (i.e. low or high).

For purposes of economy, only a single headlamp switch is used, in which case it is preferably located intermediate the two driver stations so as to be accessible from each. If such is not convenient, then two headlamp switches could be used, one at each station.

The inventive circuit can be readily adapted to an existing vehicle design by incorporating the dimmer relays 44, 46 in a suitable overlay wiring harness that can be interposed between an existing vehicle wiring harness and the various existing switches, with the relays being mounted in suitable locations in the vehicle. The circuit can also be integrated into a new wiring harness that is installed at the time of building a new vehicle.

It has been found advantageous for both dimmer relays to be fed through park switch portion 20P. It has been discovered that this connection of the dimmer relays' coils to the park output terminal 20D provides significant advantages in comparison to their connection directly to the power supply. Feedbacks, relay chatter, and the potential for inadvertently draining the power supply when the headlamps and ignition switch are off, are eliminated. Only a single circuit protection device (i.e. device 38) is employed.

While a presently preferred embodiment of the invention has been illustrated and described, it should be appreciated that principles of the invention are applicable to all embodiments that fall within the scope of the following claims

What is claimed is:

1. An automotive vehicle headlamp circuit comprising:
   a) at least one headlamp capable of providing high beam illumination and low beam illumination;
   b) a headlamp switch for turning said at least one headlamp on and off, said headlamp switch comprising input terminal means for connection to a voltage supply means, and output terminal means at which electrical potential of said voltage supply means appears when said headlamp switch is operated to turn said at least one headlamp on;
   c) dual headlamp dimmer switches, each of which is selectively operable to open and closed positions;
   d) first, second, and third controlled conduction devices, each having a control input and a controlled output controlled by said control input;
   e) means connecting a first of said dimmer switches in a first series circuit with the control input of said first controlled conduction device;
   f) means connecting a second of said dimmer switches in a second series circuit with the control input of said second controlled conduction device;
   g) means connecting said first and second series circuits between said headlamp switch output terminal means and a reference potential means to provide a potential difference across each of said first and second series circuits when said headlamp switch is operated to turn said at least one headlamp on;
   h) means connecting the controlled outputs of said first and second controlled conduction devices and the control input of said third controlled conduction device in a third series circuit;
   i) means connecting said third series circuit between said output terminal means of said headlamp switch and said reference potential means;
   j) means connecting said controlled output of said third controlled conduction device and said at least one headlamp in a fourth series circuit;
   k) means connecting said fourth series circuit between said output terminal means of said headlamp switch and said reference potential means to provide a potential difference across said fourth series circuit when said headlamp switch is operated to turn said at least one headlamp on; and
   l) wherein when said headlamp switch is operated to turn said at least one headlamp on, and when either of said dimmer switches is operated from one of its positions to the other of its positions, said controlled output of said third controlled conduction device is effective to switch said at least one headlamp from one of its beams of illumination to the other of its beams of illumination.

2. An automotive vehicle headlamp circuit as set forth in claim 1 wherein each of said first, second, and third controlled conduction devices comprises a relay, each control input comprises a coil of the respective relay, and each controlled output comprises a movable relay contact controlled by the respective relay coil.

3. An automotive vehicle headlamp circuit as set forth in claim 2 wherein:

said headlamp switch comprises a park switch portion and a headlamp switch portion;

said output terminal means of said headlamp switch comprises a park output terminal which is associated with said park switch portion and at which electrical potential of said voltage supply means appears both when said headlamp switch is operated to a park position that operates said park switch portion, but not said headlamp switch portion, and when said headlamp switch is operated to a headlamp position that turns said at least one headlamp on; and said output terminal means of said headlamp switch further comprises a headlamp output terminal which is associated with said headlamp switch portion and at which electrical potential of said voltage supply means appears when said headlamp switch is operated to headlamp position;

and wherein said means connecting said first and second series circuits between said headlamp switch terminal means and a reference potential means to provide a potential difference across each of said first and second series circuits when said headlamp switch is operated to turn said at least one headlamp on, connects to said park output terminal.

4. An automotive vehicle headlamp circuit as set forth in claim 3 wherein said input terminal means of said headlamp switch comprises a park input terminal for said park switch portion and a headlamp input terminal for said headlamp switch portion, and further including a first circuit protection device through which voltage from said voltage supply means is delivered to said park input terminal and a second circuit protection device through which voltage from said voltage supply means is delivered to said headlamp input terminal.

5. An automotive vehicle headlamp circuit as set forth in claim 4 wherein said means connecting said third series circuit between said output terminal means of said headlamp switch and said reference potential means connects to said park output terminal.

6. An automotive vehicle headlamp circuit as set forth in claim 1 wherein the headlamp circuit is disposed in an automotive vehicle that has a right-side driver station on the right side of the vehicle and a left-side driver station on the left side of the vehicle, and said dual dimmer switches are located respectively at said right- and left-side driver stations.

7. An automotive vehicle headlamp circuit as set forth in claim 6 wherein said headlamp switch is disposed at a location intermediate said driver stations so as to be accessible to a driver from each station.

8. An automotive vehicle headlamp circuit as set forth in claim 1 wherein said reference potential means is a ground potential of the circuit.

9. An automotive vehicle headlamp circuit as set forth in claim 1 wherein said at least one headlamp comprises a right-side headlamp and a left-side headlamp, each headlamp having a high-beam filament for providing high beam illumination and a low-beam filament for providing low-beam illumination.

10. An automotive vehicle headlamp circuit comprising:
    a) at least one headlamp capable of providing two different illumination patterns toward the front of a vehicle;
    b) a headlamp switch for turning said at least one headlamp on and off, said headlamp switch comprising input terminal means for connection to a voltage supply means, and output terminal means at which electrical potential of said voltage supply means appears when said headlamp switch is operated to turn said at least one headlamp on;

c) dual headlamp illumination pattern control switches, each of which is selectively operable to first and second positions;

d) a feed from said output terminal means of said headlamp switch to said at least one headlamp, said feed comprising a first controlled conduction device that is selectively operated by a controlling circuit to cause said at least one headlamp to selectively illuminate in said two different illumination patterns;

e) said controlling circuit comprising:
 i) second and third controlled conduction devices each of which is selectively operable to first and second conduction conditions;
 ii) means operatively connecting a first of said dual headlamp illumination pattern control switches with said second controlled conduction device;
 iii) means operatively connecting a second of said dual headlamp illumination pattern control switches with said third controlled conduction device; and
 iv) means operatively connecting said second and third controlled conduction devices with said first controlled conduction device for enabling either one of said first and second dual headlamp illumination pattern control switches to selectively operate said at least one headlamp to its two different illumination patterns, provided that the other one of said first and second dual headlamp illumination pattern control switches is in a particular one of its first and second positions and not in the other of its first and second positions.

11. An automotive vehicle headlamp circuit as set forth in claim 10 wherein each of said first, second, and third controlled conduction devices comprises a relay, each relay comprises a coil and a movable relay contact controlled by the respective relay coil.

12. An automotive vehicle headlamp circuit as set forth in claim 11 wherein:

said headlamp switch comprises a park switch portion and a headlamp switch portion;

said output terminal means of said headlamp switch comprises a headlamp output terminal which is associated with said headlamp switch portion and at which electrical potential of said voltage supply means appears when said headlamp switch is operated to a headlamp position that turns said at least one headlamp on; and wherein said feed connects to said headlamp output terminal.

13. An automotive vehicle headlamp circuit as set forth in claim 10 wherein the headlamp circuit is disposed in an automotive vehicle that has a right-side driver station on the right side of the vehicle and a left-side driver station on the left side of the vehicle, and said dual headlamp illumination pattern control switches are located respectively at said right- and left-side driver stations.

14. An automotive vehicle headlamp circuit as set forth in claim 13 wherein said headlamp switch is disposed at a location intermediate said driver stations so as to be accessible to a driver from each station.

15. An automotive vehicle headlamp circuit as set forth in claim 10 wherein said at least one headlamp comprises a right-side headlamp and a left-side headlamp, each being selectively operable to provide two different illumination patterns.

16. An automotive vehicle headlamp circuit as set forth in claim 15 wherein each headlamp has a high-beam filament for providing high beam illumination as one of said patterns and a low-beam filament for providing low-beam illumination as the other of said patterns.

* * * * *